United States Patent [19]

Shiokama et al.

[11] Patent Number: 5,287,138
[45] Date of Patent: Feb. 15, 1994

[54] CAMERA SYSTEM

[75] Inventors: Yoshiharu Shiokama, Chiba; Shozo Yamano, Tokyo, both of Japan

[73] Assignee: Nikon Corporation, Tokyo, Japan

[21] Appl. No.: 849,587

[22] Filed: Mar. 11, 1992

[30] Foreign Application Priority Data

Mar. 14, 1991 [JP] Japan .................. 3-74622

[51] Int. Cl.⁵ ............................................. G03B 17/00
[52] U.S. Cl. .................................................... 354/286
[58] Field of Search ............. 354/286, 289.1, 289.11, 354/289.12, 486

[56] References Cited

U.S. PATENT DOCUMENTS 4,557,579 12/1985 Nakajima ................. 354/286 X
4,695,148 9/1987 Terui et al. ................ 354/413

FOREIGN PATENT DOCUMENTS 2-113229 4/1990 Japan .

Primary Examiner—Michael L. Gellner
Assistant Examiner—Howard B. Blankenship
Attorney, Agent, or Firm—Shapiro and Shapiro

[57] ABSTRACT

A camera system in which by the mounting of a removably mountable lens, a plurality of electrical contacts between a camera body and the lens are brought into contact with one another and the transmission of information is effected between the camera body and the lens includes a camera body, a lens having no power source, a mechanical switch member provided in the lens, and power source actuating means for switching on the circuit power source of the camera body through the electrical contacts when the switch member is operated in a state in which the circuit power source is OFF.

7 Claims, 3 Drawing Sheets

CAMERA SYSTEM

BACKGROUND OF THE INVENTION

1. Field of the Invention

This invention relates to a camera system in which by the mounting of a removably mountable lens, a plurality of electrical contacts between a camera body and the lens are brought into contact with one another and the transmission of a power source, signals, etc. is effected between the camera body and the lens.

2. Related Background Art

In a camera system according to the prior art, a circuit power source such as a DC—DC converter has been switched on by a switch operatively associated with the operation of an operating member such as a release button provided on the camera body side, whereby the electric circuit of the system has been operated.

In recent years, with an increase in the kinds of functions such as automatic focusing, power focusing and power zoom, various operating members and switches have come to be provided on the lens side as well, but in the system as described above wherein the power source is switched on by the switch on the body side, it is necessary to switch on the power source by the switch on the body side without omission and then operate the switch on the lens side in order to perform the operation of the lens side, and this has led to bad operability.

Also, in a camera system like the camera system disclosed in Japanese Laid-Open Patent Application No. 2-113229 wherein power supply is effected from a camera body to a motor contained in a lens to thereby effect driving, even if the lens side prepares a power supply demand signal for receiving the power supply for the motor, the demand signal cannot be put out because communication is not established in a state in which the electric circuit on the camera side is OFF. Therefore, when motor driving such as for power focusing is to be effected on the lens side, it has been necessary for the photographer to manually operate the switch on the camera body side without omission to thereby switch on the electric circuit and put out the power supply demand signal, and thereafter start power focusing or the like.

Now, U.S. Pat. No. 4,695,148 discloses the technique of switching on a power source on the camera body side from a flash device, and more specifically, there is a power source on the flash device side and an operating member on the flash device side is operated while that power source is switched on, whereby a power source on the camera body side is electrically switched on. Accordingly, when the power source on the flash device side is consumed up, the power source on the camera body side cannot be switched on from the flash device side.

SUMMARY OF THE INVENTION

So, the object of the present invention is to provide a camera system in which when in a lens having no power source, the lens side operation is to be performed, the lens side is operated even if a switch on the body side is not operated.

For the above object, a camera system according to the present invention in which by the mounting of a removably mountable lens, a plurality of electrical contacts between a camera body and the lens are brought into contact with one another and the transmission of information is effected between the camera body and the lens includes a camera body, a lens having no power source, a mechanical switch member provided in said lens, and power source actuating means for switching on (enabling) a circuit power source of said camera body through said electrical contacts when said switch member is operated in a state in which said circuit power source is OFF (disabled).

DETAILED DESCRIPTION OF THE PREFERRED EMBODIMENTS

Some embodiments of the present invention will hereinafter be described in detail with reference to the drawings.

First Embodiment

Figure 1:
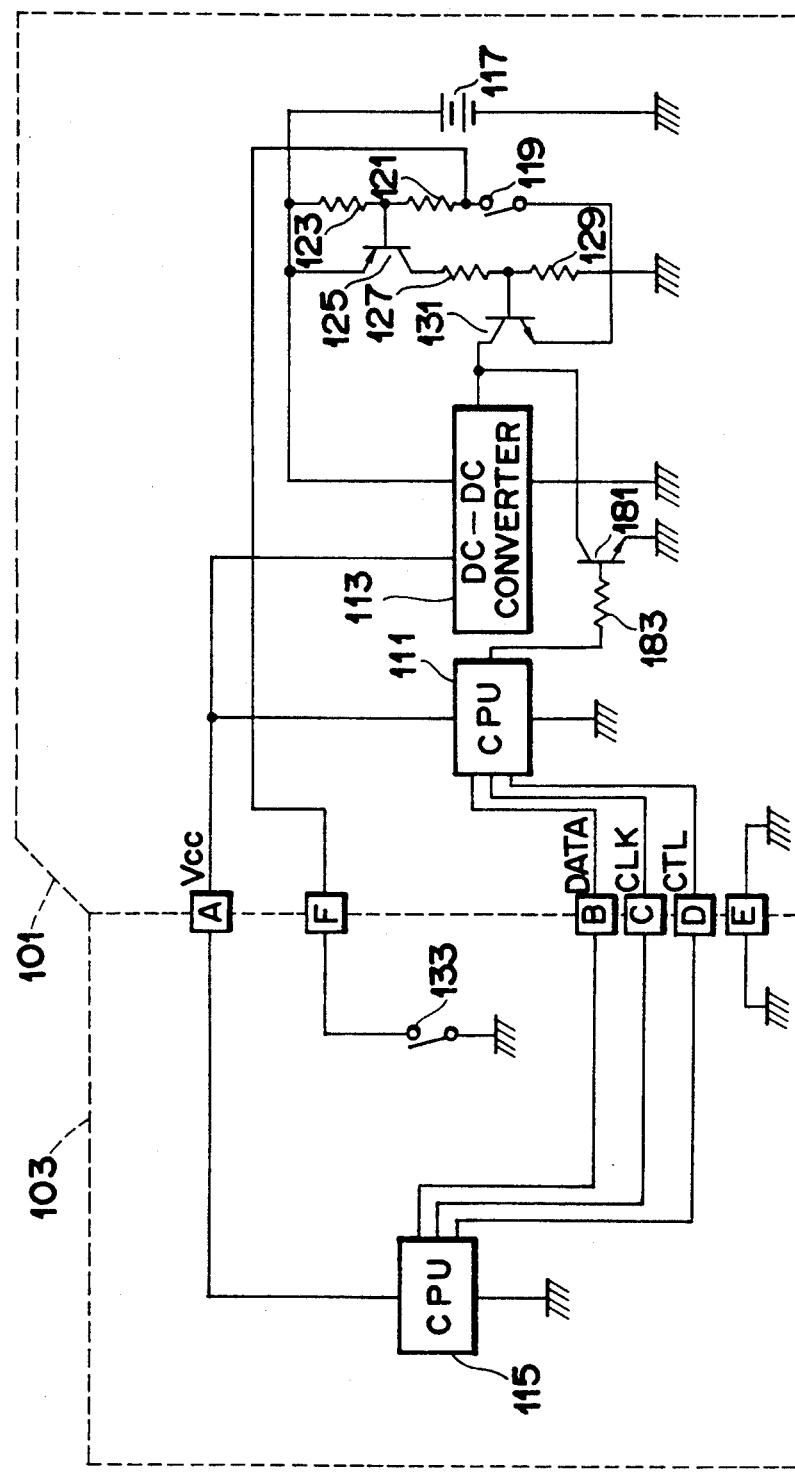
FIG. 1 is a construction diagram showing a first embodiment of a camera system according to the present invention.

FIG. 1 is a construction diagram showing a first embodiment to which a camera system according to the present invention is applied. In FIG. 1, the reference numeral 101 designates a camera body, and the reference numeral 103 denotes an interchangeably provided lens. The camera body 101 and the lens 103 are capable of effecting information transmission and power supply therebetween through electrical contacts A-F.

A power source 117 in the camera body 101 is connected to a DC—DC converter 113 provided in the camera body 101. The stabilized output Vcc of the DC—DC converter 113 is put out as the power source of a microcomputer (CPU) 111 provided in the body 101 and is put out as the power source of a microcomputer (CPU) 115 on the lens 103 side to the lens 103 and the contact A. The communication lines DATA (data line), CLK (clock line) and CTL (control line) between the body and the lens are connected together by the contacts B, C and D between the body and the lens, and are connected to the microcomputers 111 and 115 on the body side and the lens side, respectively. The contact E is the contact of a grand line. The contact F is a contact for transmitting to the body side the state of a lens side switch 133 adapted to be opened and closed in response to lens side operating members. The lens side operating members include various operating members provided on the lens such as a power focus operating member and a power zoom operating member.

A body side switch 119 is a power source switch adapted to be opened and closed, for example, in response to a release button. When the switch 119 is closed, a transistor 125 is driven through resistors 121 and 123, and the output of the transistor 125 drives a transistor 131 through resistors 127 and 129. When the transistor 131 is turned on, the DC—DC converter 113 is actuated and a power source is supplied to the microcomputers 111 and 115, whereby the camera and the lens become electrically operative. When the microcomputer 111 starts its operation, a transistor 181 is turned on for a predetermined time and the operative state of the power source is maintained.

The lens side switch 133 is parallel-connected to the body side switch 119 through the contact F. Accordingly, in the present embodiment, when the lens side switch 133 is closed in response to the operation of the lens side operating member, the transistors 125 and 131 are driven as when the body side switch 119 is closed through the contact F, and the DC—DC converter 113 is actuated. Thus, according to the present embodiment, even when the body 101 is not in its operative state, it is possible to render both of the body and the lens operative simply by operating the lens side switch 133.

Figure 2:
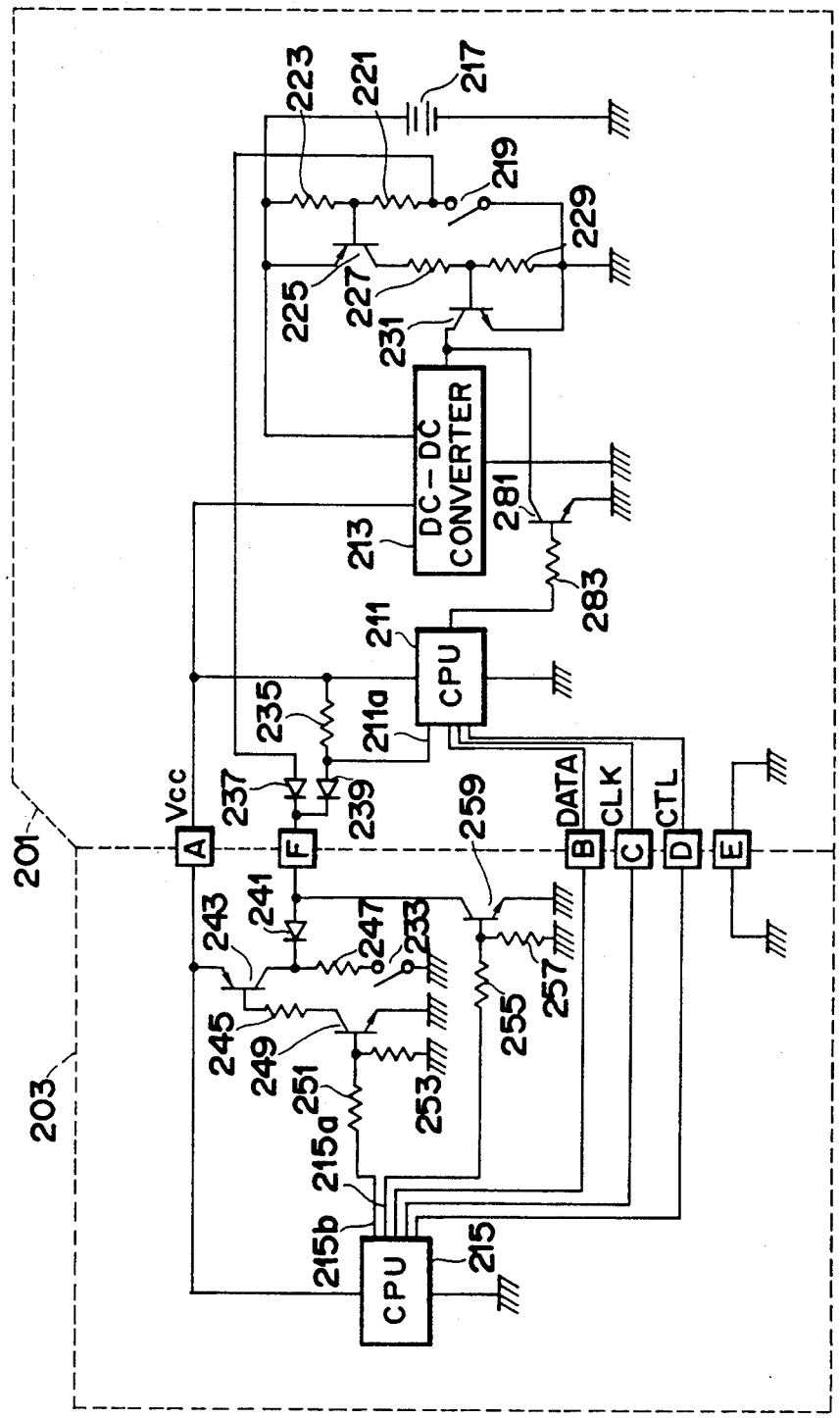
FIG. 2 is a construction diagram showing a second embodiment of the camera system according to the present invention.

FIG. 2 is a construction diagram showing a second embodiment of the camera system according to the present invention. In FIG. 2, constituents similar to those in the first embodiment are given reference numerals of the order of 200 corresponding to the reference numerals of the corresponding constituents in the first embodiment and need not be described.

Second Embodiment

In the first embodiment, the contact F is exclusively used to transmit the state of the lens side switch 133 to the body side, whereas in the second embodiment, the contact F can be used also as the communication line between the microcomputers 211 and 215 on the body side and the lens side, respectively. That is, the contact F transmits the state of the lens side switch 233 when the DC—DC converter 213 is OFF, and functions as the communication line between the microcomputers 211 and 215 when the DC—DC converter 213 is ON and the body and the lens are in operation. For this purose, a diode 241 having its anode side facing the contact F of the lens 203 is provided on the contact F, and the cathode thereof is connected to the switch 233 through a resistor 247 and is grounded when the switch 233 is closed. The cathode is also connected to the line of the power source Vcc through a transistor 243, and the diode 241 is reversely biased when the transistor 243 is in its conductive state. The transistor 243 is driven by a transistor 249 which in turn is driven by the output of the output port 215b of the microcomputer 215, and during the operation of the microcomputer 215, the output port 215b thereof assumes a high level and thus, the transistor 249 conducts and the transistor 243 conducts.

On the other hand, a diode 237 having its cathode side facing the contact F of the camera body 201 is provided between the contact F and the switch 219. Also, the contact F and the input port 211a of the body side microcomputer 211 are connected together through a diode 239 having its cathode side facing the contact F. The portion between the diode 241 and the contact F is grounded through a transistor 259, which is rendered conductive when the output port 215a of the microcomputer 215 assumes a high level, and is rendered non-conductive when the output port 215a assumes a low level. The output port 215a of the microcomputer 215 is designed to assume a high level when the lens side assumes a certain state.

The operation of the second embodiment will now be described.

When the body and the lens are not in operation, that is, when the DC—DC converter 213 is OFF, both of the output ports 215a and 215b of the lens side microcomputer 215 are at a low level and both of the transistors 259 and 243 maintain their non-conductive state. When the lens side switch 233 is closed, the transistor 225 is driven through the diodes 241, 237, the contact F and the resistors 221, 223. As a result, as in the first embodiment, the DC—DC converter 213 is switched on and the microcomputers 211 and 215 of the body and the lens, respectively, are operated. The lens side microcomputer 215, when its operation is started, renders its output port 215b into a high level, drives the transistor 249 through resistors 251 and 253 and further, turns on the transistor 243 through the resistor 245. In this state, the diode 241 is reversely biased irrespective of the state of the switch 233 and therefore, the signal level of the contact F depends on the conduction or non-conduction of the transistor 259, i.e., the state of the output port 215a of the microcomputer 215. Accordingly, if for example, design is made such that the output port 215a is changed over to a high level or a low level each time the lens is moved by a predetermined amount, the transistor 259 is thereby rendered into its conductive or non-conductive state and the signal level of the contact F becomes a low level or a high level, and the body side microcomputer 211 recognizes that change as a pulse through the diode 239 and the input port 211a, and by counting this pulse, it becomes possible to detect the amount of movement of the lens.

When a desired power source holding time passes during the operation of the DC—DC converter 213, a command for opening the contact F is put out from the body side microcomputer 211 to the lens side microcomputer 215. In response to this command, the microcomputer 215 of the lens 203 turns off the transistor 259 to thereby open the contact F, whereafter the body side microcomputer 211 turns off the transistor 281 to thereby stop the DC—DC converter 213. The reason why the transistor 259 is turned off to thereby open the contact F is that even if the power source holding transistor 281 is turned off by the body side microcomputer 211, if the transistor 259 remains conductive, the DC—DC converter 213 will continue to be actuated through the body side transistors 225 and 231 and thus, the power source cannot be cut off from the body side.

Like this, in the present embodiment, the contact F is endowed with two functions and therefore, the number of contacts may be small, and this is advantageous in respect of space and cost.

Third Embodiment

Figure 3:
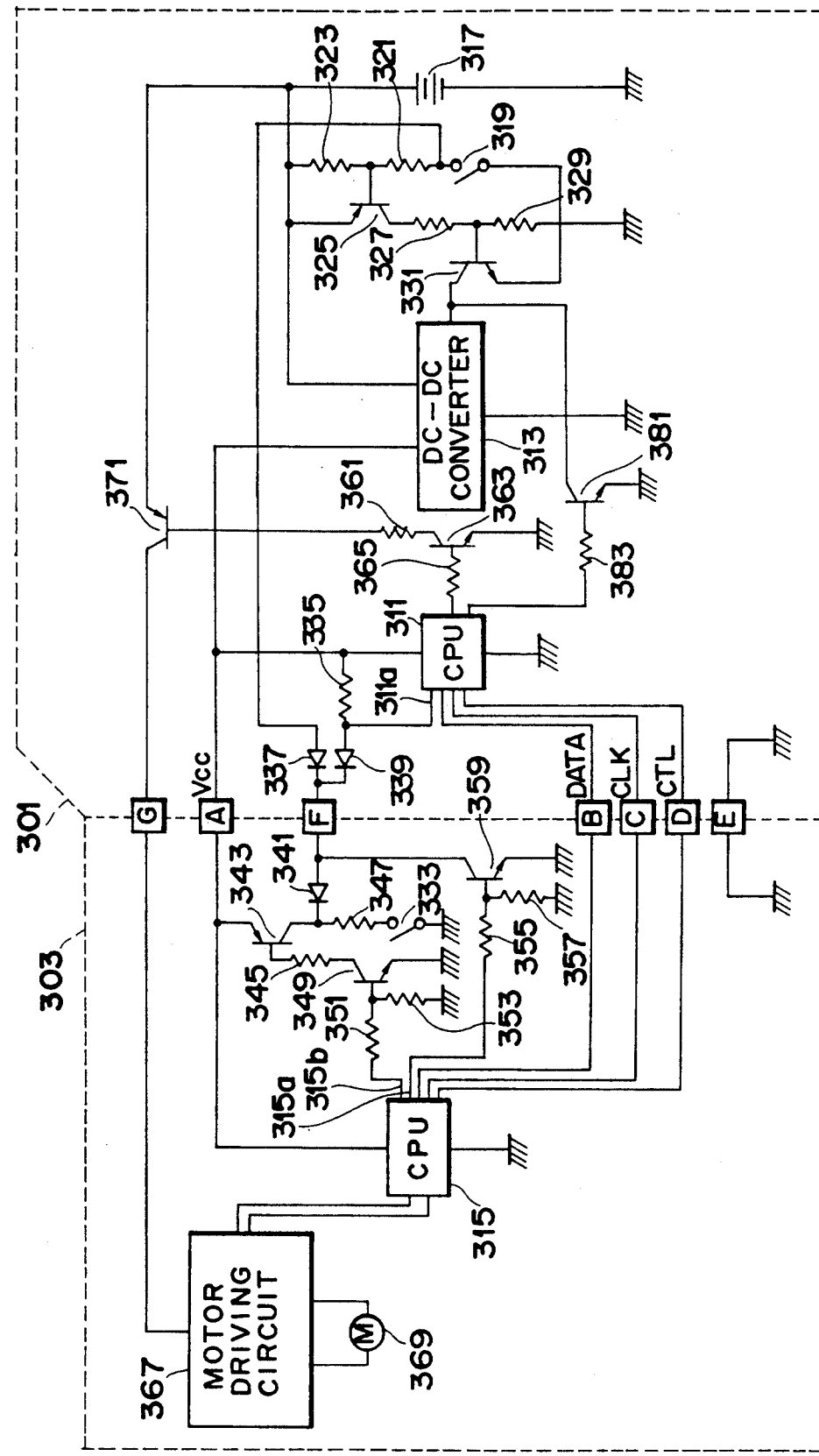
FIG. 3 is a construction diagram showing a third embodiment of the camera system according to the present invention.

FIG. 3 is a construction diagram showing a third embodiment of the camera system according to the present invention. In FIG. 3, constituents similar to those in the second embodiment are given reference numerals of the order of 300 corresponding to the reference numerals of the corresponding constituents in the first and second embodiments and need not be described.

The third embodiment is a system in which the lens 303 contains a motor 369 and a motor driving circuit 367 therein and the power source of the motor is supplied from a body side power source 317. Therefore, in addition to the construction of the second embodiment, there is provided a contact G for the supply of the motor power source connected to the motor driving circuit 367 and there is also provided a switch circuit for switching the supply of the motor power source. This switch circuit is comprised chiefly of a tranistor 371 provided between the power source 317 and the contact G, and a transistor 363 provided between the transistor 371 and the body side microcomputer 311.

The operation of the third embodiment will now be described.

As in the second embodiment, when a motor power source demand is put out from the lens side 303 to the body through a communication line in a state in which the power source of the microcomputers 311 and 315 is supplied upon operation of the lens side switch 333, the body side microcomputer 311 drives the transistor 363 from the output port thereof through a resistor 365 to thereby turn on the transistor 371 through a resistor 361. As a result, electric power is supplied from the power source 317 in the body 301 to the lens side motor driving circuit 367 and thus, the driving of the motor becomes possible.

Like this, according to the present embodiment, after the actuation by the lens side switch 333, the power source for driving the motor can be supplied from the body 301 side in response to the motor power source demand from the lens 303 side, and operability is improved.

In the present embodiment, the transistor 371 may be turned on simultaneously with the actuation by the switch 333 on the lens 303 side, and the motor 369 on the lens 303 side may be immediately driven. According to such a construction, the drive responsiveness of the motor 369 is improved.

As described above, according to the present invention, design is made such that when the switch member on the lens side is closed in a state in which the circuit power source of the camera body is OFF, the circuit power source of the camera body is switched on (enabled) and therefore, simply by operating the switch member on the lens side when the lens side operation is to be performed, the electric circuits of the body and lens are switched on and the electrical operation of the lens becomes possible and thus, for example, the operability of power focusing or the like becomes very good and quick photographing becomes possible. Also, when it is desired to see the display regarding exposure or the display of the focus state on the body side, the display on the body side can be confirmed simply by performing the lens side operation without performing the operation of the body side switch. Further, it also becomes possible to transmit the various states of the lens by the use of the contact for transmitting the circuit power source ON demand from the lens side, and effective utilization of the contact can be achieved. Furthermore, the starting responsiveness of the motor contained in the lens become good and operability is improved.

Although in the present embodiment, design is made such that when the switch member on the lens side is closed in a state in which the circuit power source of the camera body is OFF (disabled), the circuit power source of the camera body is switched on (enabled), the switch on the lens side is a mechanical one and the lens itself does not particularly require a power source. According, the problem that the power source on the lens side is consumed and the power source on the camera body cannot be switched on is out of the bounds of possibility, and in whatever state, the camera body side can always be actuated from the lens side.

What is claimed is:

1. A camera system in which by the mounting of a removably mountable lens, a plurality of electrical contacts between a camera body and the lens are brought into contact with one another and the transmission of information is effected between the camera body and the lens, including:
    a camera body having a circuit power source;
    a lens having no power source;
    a mechanical switch member provided in said lens; and
    power source actuating means for transmitting the operated state of said mechanical switch member to said camera body through said electrical contacts when said mechanical switch member is operated in a state in which the circuit power source of said camera body is disabled, thereby enabling said circuit power source.

2. A camera system according to claim 1, further including a switching circuit for transmitting the operated state of said mechanical switch member to said camera body through an electrical contact connected to said mechanical switch member when said circuit power source is disabled, and transmitting an electrical signal indicative of the state of said lens to said camera body through the same contact independently of the operated state of said mechanical switch member when said circuit power source is enabled.

3. A camera system according to claim 1, further including a motor and a switch circuit adapted to be closed when the circuit power source of said camera body is enabled by said mechanical switch member, thereby applying the output of said circuit power source to said motor.

4. A camera system in which by the mounting of a removably mountable lens, a plurality of electrical contacts between a camera body and the lens are brought into contact with one another and the transmission of information is effected between the camera body and the lens, including:
    a camera body having a circuit power source;
    a lens having no power source;
    a mechanical switch member provided in said lens;
    power source actuating means for closing said electrical contacts when said mechanical switch member is operated in a state in which the circuit power source of said camera body is disabled, thereby enabling said circuit power source; and
    power source stopping means for transmitting instruction information for opening said electrical contacts form said camera body to said lens in a state in which said circuit power source is enabled, and disabling the circuit power source of said camera body after said electrical contacts are opened.

5. A lens removably mountable with respect to a camera body having a circuit power source and in which by the mounting of said lens, a plurality of electrical contacts between it and said camera body are brought into contact with one another and the transmission of information is effected between said lens and said camera body, said lens being a lens having no power source, said lens including:
    a mechanical switch member provided in said lens; and
    power source actuating means for transmitting the operated state of said mechanical switch member to said camera body through said electrical contacts when said mechanical switch member is operated in a state in which the circuit power source of said camera body is disabled, thereby enabling said circuit power source.

6. A lens according to claim 5, further including a switching circuit for transmitting the operated state of said mechanical switch member to said camera body through an electrical contact connected to said mechanical switch member in a state in which said circuit power source is disabled, and transmitting an electrical signal indicative of the state of said lens to said camera body through the same electrical contact independently of the operated state of said mechanical switch member in a state in which said circuit power source is enabled.

7. A lens according to claim 5, further including a motor and a switch circuit adapted to be closed when the circuit, power source of the camera body is enabled on by said mechanical switch member, thereby applying the output of said circuit power source to said motor.

* * * * *